United States Patent [19]

Rossi

[11] 4,227,204

[45] Oct. 7, 1980

[54] METHOD AND APPARATUS FOR PCM-ENCODING NTSC COLOR TELEVISION AT SUB-NYQUIST RATE

[75] Inventor: John P. Rossi, Stamford, Conn.

[73] Assignee: CBS Inc., New York, N.Y.

[21] Appl. No.: 944,533

[22] Filed: Sep. 21, 1978

[51] Int. Cl.² ............................................. H04N 9/32
[52] U.S. Cl. ....................................................... 358/13
[58] Field of Search ..................................... 358/13, 12

[56] References Cited

U.S. PATENT DOCUMENTS

| 3,858,240 | 12/1974 | Golding et al. ..................... 358/13 |
| 4,037,248 | 7/1977 | Iijima et al. ......................... 358/13 |
| 4,051,516 | 9/1977 | Weston ................................. 358/13 |
| 4,151,550 | 4/1979 | Dinstein .............................. 358/13 |

*Primary Examiner*—Richard Murray
*Attorney, Agent, or Firm*—Spencer E. Olson

[57] ABSTRACT

A sub-Nyquist sampled PCM NTSC color television signal is obtained directly from a PCM encoded color television signal sampled at four times the color subcarrier frequency by selecting every other sample in each line of the $4F_{sc}$ sampled television signal and introducing a one $4F_{sc}$ sample displacement every two sequential television lines. A sub-Nyquist sampled signal may also be obtained from an NTSC color television signal having a color subcarrier frequency $F_{sc}$ by generating a sampling signal having a frequency of $2F_{sc}$, the sampling phase of which shifts by 180° every alternate time sequential television line, and sampling the NTSC color television signal in response to the sampling signal. Whichever of these two techniques is used to obtain the sub-Nyquist samples, the $4F_{sc}$ samples can be reconstructed when comb filters are used to remove alias components. The process of converting $4F_{sc}$ encoded signals to sub-Nyquist and back to $4F_{sc}$ can be repeated without impairing picture quality beyond that introduced during the first conversion-reconversion process.

11 Claims, 14 Drawing Figures

METHOD AND APPARATUS FOR PCM-ENCODING NTSC COLOR TELEVISION AT SUB-NYQUIST RATE

BACKGROUND OF THE INVENTION

This invention relates generally to television apparatus, and more particularly to a method and apparatus for digitally encoding and processing an NTSC color television signal.

In digital television systems, it is necessary to reduce the bit rate of the digital television signals, usually pulse code modulated (PCM), whenever a transmission channel or a digital store is limited in capacity. One way of doing this is to lower the PCM encoding frequency, $F_s$; however, the Nyquist sampling limit is soon reached, and further reduction in sampling frequency results in beat distortions due to "alias components" when the lower sidebands of $F_s$ overlap the baseband video frequencies; since the baseband video bandwidth, $F_v$, for the NTSC system of television is 4.2 MHz, the Nyquist sampling limit is reached when $F_s 2F_v$, i.e., $F_s = 8.4$ MHz.

It is known from applicant's U.S. Pat. No. 4,065,784 that NTSC color television signals can be digitally encoded at sub-Nyquist rates by placing the alias components into those parts of the spectrum not normally occupied by the luminance or chrominance components of the video signal. In the patented system, $F_s$ is exactly $2F_{sc} \frac{1}{4} F_h$ or $2F_{sc} - \frac{1}{4} F_h$, where $F_{sc}$ is the NTSC color subcarrier frequency and $F_h$ is the line-scan frequency. Most of the alias signals in the thus-encoded signal are removed from the baseband video by comb filtering between $(F_s - F_v)$ and $F_v$.

It has recently been proposed that the NTSC color television signal be encoded at a sampling rate four times the color subcarrier frequency (i.e., $4F_{sc}$) in order to maintain picture quality and ease digital processing. Encoding at this sampling frequency results in a bit rate of 114 Mbs, which may be excessive for certain applications. Although sub-Nyquist encoding is a way to reduce the bit rate, the quarter line frequency offset described in the aforementioned patent makes it difficult and expensive to obtain the correct samples from a $4F_{sc}$ encoded PCM television signal.

It is the primary object of the present invention to provide a method and apparatus for obtaining a sub-Nyquist sampled signal directly from $4F_{sc}$ samples without the need for interpolation, from which the $4F_{sc}$ samples can again be readily reconstructed, using comb filters to remove alias components.

Another object of the invention is to provide a method and apparatus for obtaining from an analog NTSC color television signal a sub-Nyquist encoded PCM signal from which $4F_{sc}$ samples can be readily reconstructed.

SUMMARY OF THE INVENTION

Briefly, according to one aspect of the invention, a sub-Nyquist sampled NTSC color television signal having a sampling frequency of twice the color subcarrier, that is, $2F_{sc}$, in which the resultant alias components are interlaced between the luminance and chrominance peaks of the energy spectrum to allow their removal from the baseband video by comb filtering, is obtained by retaining every other sample of a PCM-encoded signal sampled at four times the color subcarrier frequency (i.e., $4F_{sc}$) and introducing one sample displacement every two sequential television lines. This is accomplished without the need for interpolation by introducing a 180° phase shift in the $2F_{sc}$ sampling frequency every alternate time sequential television line. Using comb filtering to remove alias components, the $4F_{sc}$ samples can be reconstructed, and the process of converting $4F_{sc}$ encoding to sub-Nyquist and back to $4F_{sc}$ can be repeated as necessary without impairing the television picture beyond that introduced during the first conversion—reconversion process.

According to another aspect of the invention, instead of obtaining the sub-Nyquist sampled signal from the $4F_{sc}$ samples, means are provided for sampling an analog NTSC color television signal at a sampling frequency $2F_{sc}$ to obtain a PCM-encoded signal in which the alias components are interlaced between the luminance and chrominance peaks of the energy spectrum. By using comb filtering to remove alias components, $4F_{sc}$ samples can be constructed from the $2F_{sc}$ samples, and the thus-produced $4F_{sc}$ samples can be sampled in the manner described in the preceding paragraph, if desired, to convert back to $2F_{sc}$ samples.

BRIEF DESCRIPTION OF THE DRAWINGS

Other objects, features and advantages of the invention will become apparent, and its construction and operation better understood, from the following description, taken in conjunction with the accompanying drawings, in which.

DESCRIPTION OF THE PREFERRED EMBODIMENT

Figure 1:
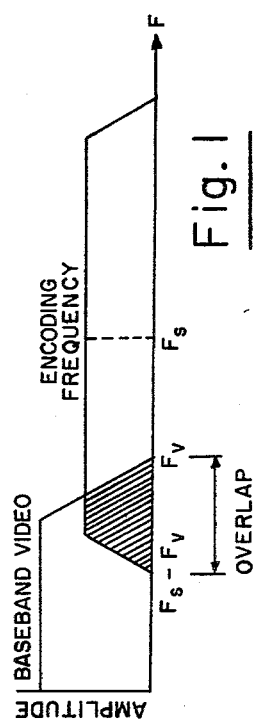
FIG. 1 is a diagram showing the foldover of the lower encoded video sideband onto the baseband video when $F_s$ is less than $2F_v$.

Before proceeding to the description of the sub-Nyquist encoding system according to the invention, it will be useful to review the problem inherent in sub-Nyquist encoding of television signals, and the significant spectral characteristics of the NTSC color television signal. As was mentioned earlier, when in PCM encoding NTSC television signals it is attempted to reduce the sampling frequency, $F_s$, below the Nyquist limit, beating or "alisasing" distortion occurs due to the lower sidebands of $F_s$ overlapping the baseband video signals, as shown in FIG. 1. For NTSC television, $F_v=4.2$MHz; consequently, the Nyquist sampling limit is reached when $F_s=2F_v$, or when $F_s=8.4$MHz.

Figure 2:
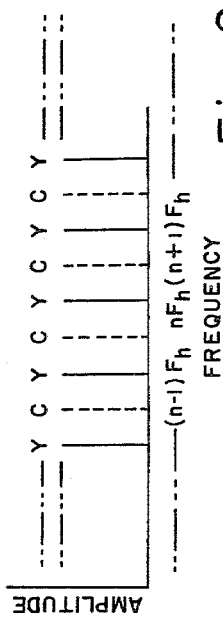
FIG. 2 is a diagram showing the spectral characteristic of the main Y and C energy components of an NTSC color television signal within the chrominance sidebands.

In the NTSC color television signal, the spectral energy of the luminance (Y) signal is essentially centered at harmonics of the line scanning frequency $F_h$; i.e., $nF_h$, where n is a integer. The chrominance (C) signal spectral energy peaks at odd harmonics of $\frac{1}{2}F_h$; i.e., $(n+\frac{1}{2})F_h$. Thus, the luminance and the chrominance energy bundles are frequency interleaved as shown in FIG. 2.

Figure 3:
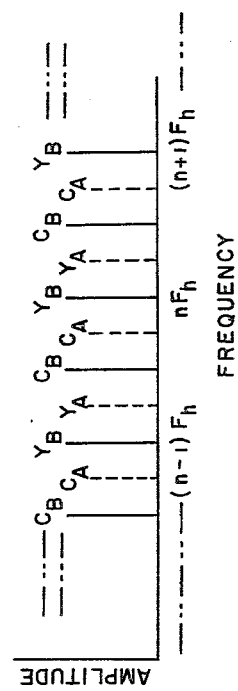
FIG. 3 is a diagram showing desired spectral characteristics for a sub-Nyquist sampled NTSC color television signal.

To encode the PCM NTSC color television signal at a sub-Nyquist rate and subsequently remove the alias components, the encoding frequency $F_s$ should be chosen to frequency interlace the alias components between the desired luminance and chrominance components, as shown in FIG. 3. Included are the peak baseband frequency components of the luminance, $Y_B$, and chrominance, $C_B$, signals, and the alias luminance components, $Y_A$, and alias chrominance components, $C_A$. The sub-Nyquist system described in the aforementioned patent uses an encoding frequency of $2F_{sc}+\frac{1}{4}F_h$ to produce the frequency spectrum shown in FIG. 3. Unfortunately, such samples are not readily obtainable from a $4F_{sc}$ encoded PCM television signal that may become the recommended standard in the broadcasting industry.

Applicant has shown in his aforementioned patent that when the sub-Nyquist sampling frequency selected for NTSC color television signals produces the spectral frequency response shown in FIG. 3, the luminance and chrominance information can be recovered and the undesired alias components rejected by means of suitable transversal comb filtering, and the description thereof is hereby incorporated by reference. However, for clarity of understanding of the present method for PCM-encoding NTSC color television signals at a sub-Nyquist rate, the technique for rejecting alias signals by means of comb filtering will be briefly reviewed. As seen in FIG. 3, the centers of the alias energy bursts are separated by frequency inrtervals of $\frac{1}{2}F_h$. The comb filter, therefore, should have its maximum responses (teeth) or minimum responses (nulls) at frequency intervals of $\frac{1}{2}F_h$. Such comb filter can be made by combining video signals from alternate time-sequential television lines. For example, in a particular field, line l would be combined with line (l=2) or (l+2). Since a transversal filter that combines television lines can cause objectionable transients and a loss of vertical resolution in the television picture, it is desirable to combine as few lines as possible to obtain the necessary comb filter frequency response. The alias components can be removed from a sub-Nyquist encoded NTSC color television signal having the spectral frequency response shown in FIG. 3 by using either of the following comb filter algorithms:

1. Add television line l to (l−2).
2. Add television line l to (l+2); or
3. Add television line l to $\frac{1}{2}[(l-2)+(l+2)]$.

Figure 4:
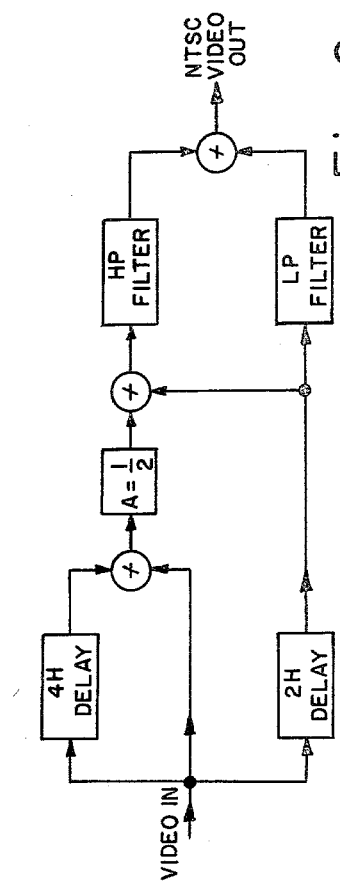
FIGS. 4, 5 and 6 are block diagrams of three different forms of comb filters useful in the practice of the invention.
Figure 5:
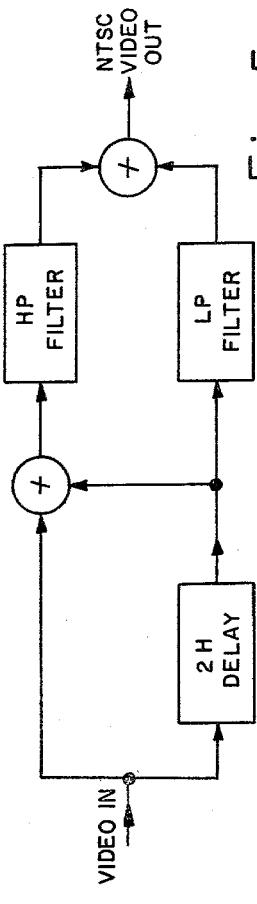
Figure 6:
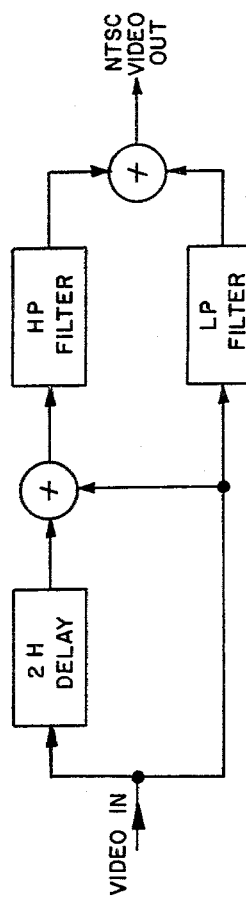
Figure 7:
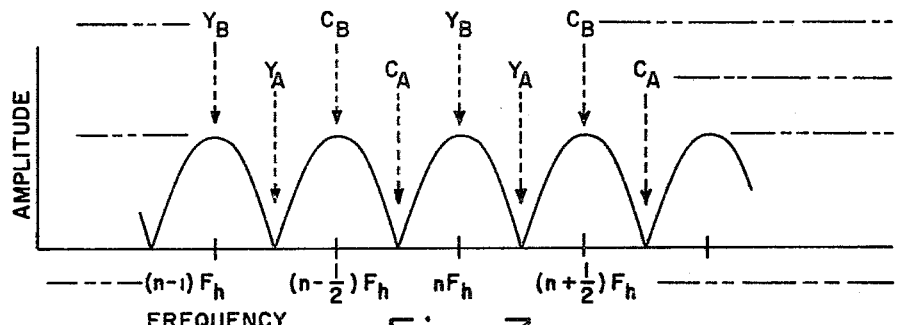
FIG. 7 is a diagram showing the frequency response of one form of comb filter.
Figure 8:
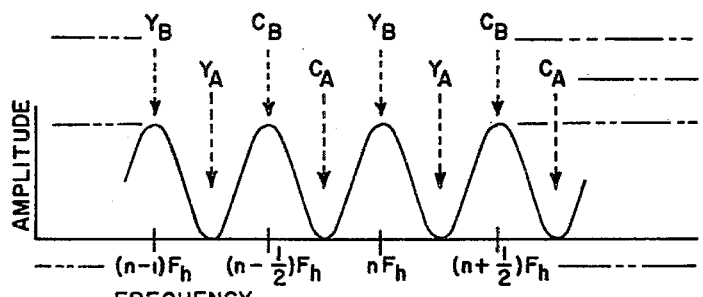
FIG. 8 is a diagram showing the frequency response of another form of comb filter.

All lines are from a single field to avoid the need for interfield storage in the decoder. Block diagrams of three possible comb filters are showm in FIGS. 4, 5 and 6, which respectively correspond to FIGS. 6, 7 and 8 of the aforementioned patent. The frequency response of the filters of FIGS. 4 and 5 is shown in FIG. 7, and the frequency response of the FIG. 6 filter is shown in FIG. 8. It will be noted in both FIGS. 7 and 8 that there are nulls at the alias peak amplitude frequency components, and the teeth are centered at the peak amplitude frequency components of the baseband signals.

As has been previously noted, the sub-Nyquist sampling frequency selected for NTSC color television signals should result in the spectral frequency response shown in FIG. 3 in order readily to recover the luminance and chrominance information and reject the undesired alias components. A sub-Nyquist sampling frequency of $nF_n$ will result in luminance alias components overlapping the baseband main luminance components and chrominance alias components overlapping the baseband chrominance. Sub-Nyquist sampling at $nF_h$ with $\frac{1}{2}F_h$ offset will cause luminance alias components to overlap the baseband chrominance, and the chrominance alias components to overlap the baseband luminance. Thus, these two sampling methods will not work. In the system of the aforementioned patent, a $\frac{1}{4}F_h$ offset in the $nF_h$ sub-Nyquist sampling rate places the alias components between the baseband luminance and chrominance main frequency components, which operates satisfactorily. However, the quarter line frequency offset makes it difficult and expensive to obtain the correct samples from a $4F_{sc}$ encoded PCM television signal, which may become the recommended standard in the broadcasting industry, thus presenting the need for readily obtaining the sub-Nyquist samples signal from a $4F_{sc}$ sampled signal. The fact that $4F_{sc}=910F_h$ suggests that the sub-Nyquist sampling frequency should be $2F_{sc}$, or 455 $F_h$, which dictates that means other than a $\frac{1}{4}F_h$ frequency offset must be provided to interlace the resultant alias components between the luminance and chrominance energy peaks.

Figure 9:
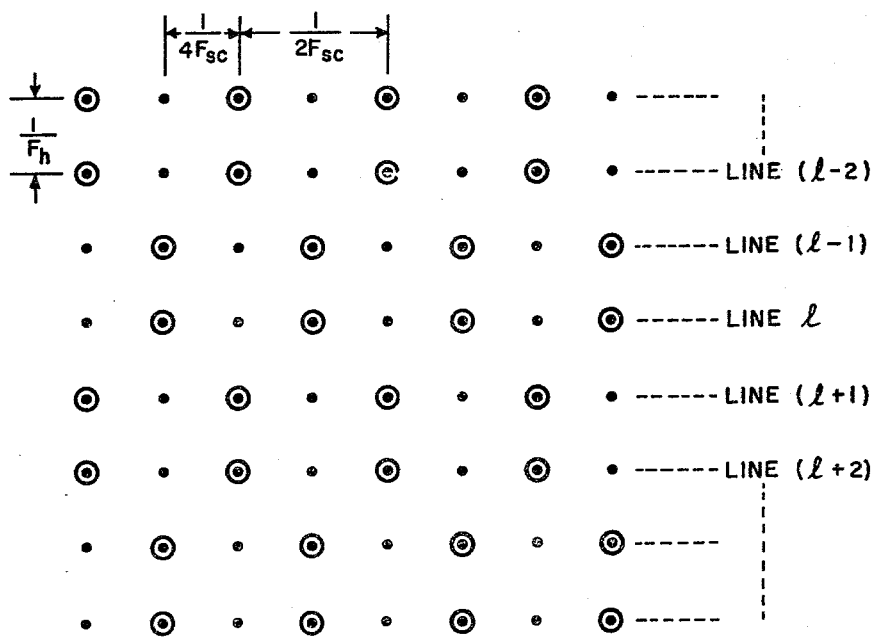
FIG. 9 is the spatial sampling pattern on the image plane of a sub-Nyquist sampled PCM NTSC color television signal derived from a $4F_{sc}$ sampled signal.

This is accomplished according to the present invention by introducing a 180° phase shift in the sampling frequency every alternate time sequential television line. The effect of this will be seen from examination of FIG. 9 which depicts the pattern of the spatial picture samples on the image plane, the dots representing sampling points taken at the rate of 14.32 MHz, of four times the color sub-carrier frequency, which are spatially aligned on successive video scan lines (l=2), (l−1), l, (l+1), etc., and spaced 1/4$F_{sc}$, or 70 nanoseconds apart. The circles represent sampling points of the sub-Nyquist sampled PCM NTSC color television signal derived from the $4F_{sc}$ sampled signal; it is seen that the circles are spread apart 1/2$F_{sc}$, or nominally 140 nanoseconds, along each scan line, and are displaced one sample interval every two sequential television lines. That is, the circles in lines (l−1) and l are displaced to the right one sample interval with respect to the circles in the two television lines preceding and following them. In summary, the sampling frequency of the sub-Nyquist samples is exactly $2F_{sc}$ with appropriate phase shifts at the starts of different television lines. It will be appreciated that with this technique the sub-Nyquist encoded signal can be obtained from the $4F_{sc}$ PCM encoded signal without any need for interpolators; the process is one of simply retaining the appropriate ones of the $4F_{sc}$ samples. With proper precautions it is possible to go back and forth between the $4F_{sc}$ encoded signal and the $2F_{sc}$ encoded signal an unlimited number of times without any further video degradation than that caused by the first translation from $4F_{sc}$ to $2F_{sc}$, as long as the same samples from the same frames are selected. This guarantees that the sub-Nyquist digital stream will always consist of a selected set (as per FIG. 9) of unprocessed original $4F_{sc}$ samples.

It is interesting to note that if it is assumed that no two samples in the sub-Nyquist digital stream are separated by less than the period $\frac{1}{2}F_{sc}$, the resultant long term average sampling frequency is $2F_{sc}-\frac{1}{4}F_h$. Thus, there is a $\frac{1}{4}F_h$ frequency offset, except that here, unlike in the patented system, this frequency offset is not continuous but is a result of the sample displacements that are introduced every two television lines.

Figure 10:
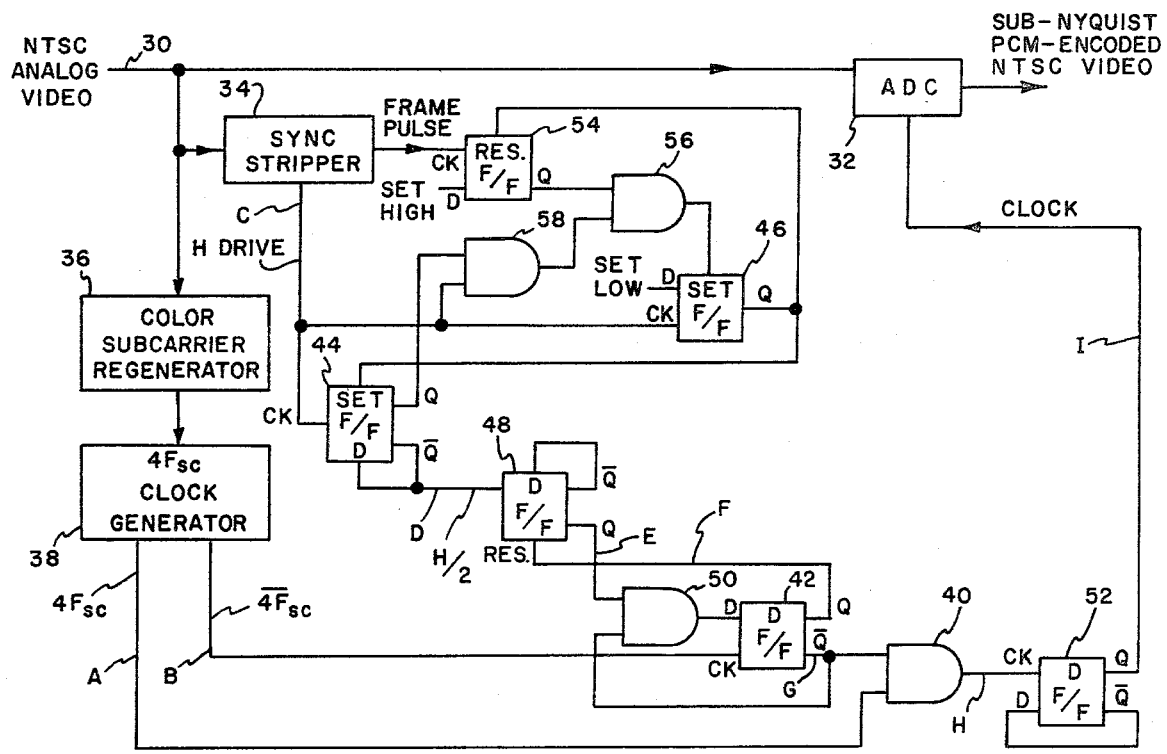
FIG. 10 is a block diagram of a system for sampling an analog NTSC television signal at a sub-Nyquist frequency $2F_{sc}$.
Figure 11:
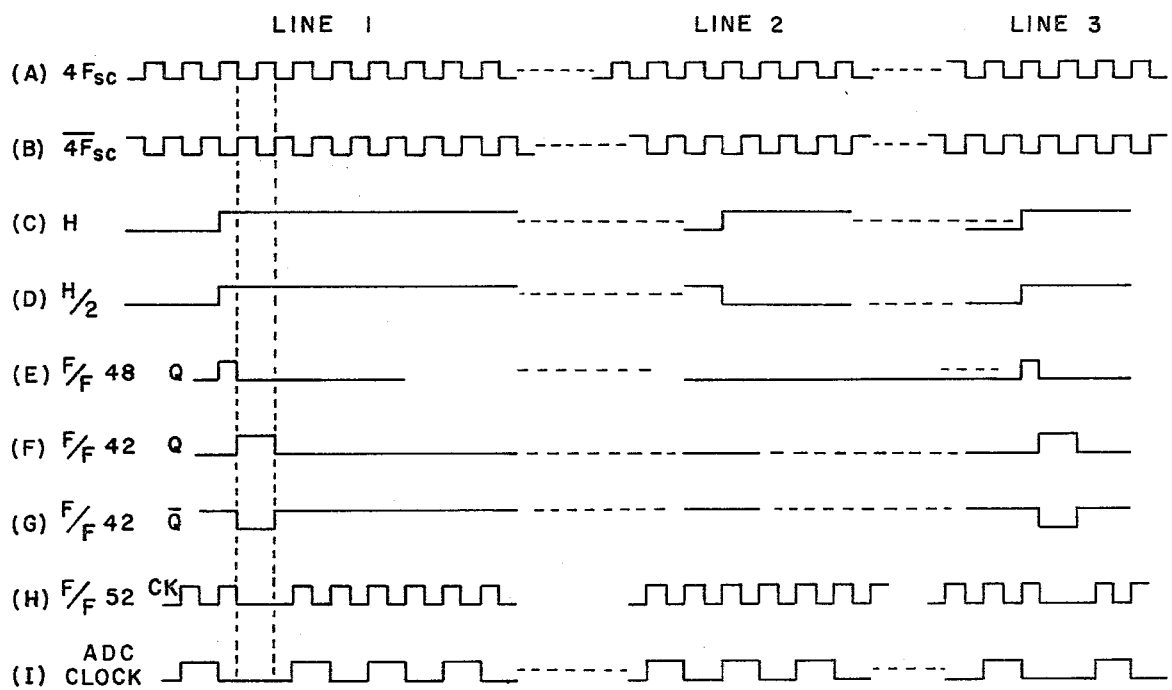
FIG. 11 is a set of waveforms at different points in the system of FIG. 10 useful to understanding its operation.

FIG. 10 shows in block diagram form a system for PCM-encoding an NTSC color television signal at the sub-Nyquist rate of $2F_{sc}$. An input NTSC video signal in analog form, which has preferably been subjected to comb filtering for the reasons and in the manner discussed hereinafter, is received on line 30 and coupled to the input of an analog-to-digital converter 32, to sync stripper 34, and to a color subcarrier regenerator 36. The color subcarrier regenerator is of conventional design and regenerates the color subcarrier which, in the NTSC color television system, is 3.58 MHz. The regenerated color subcarrier signal is applied to and controls a clock generator 38 which produces two trains of clock pulses both having a frequency of $4F_{sc}$, but with one 180° out of phase with respect to the other, as shown by waveforms (A) and (B) of FIG. 11. The $4F_{sc}$ pulse train is applied as one input to an AND circuit 40 and the $\overline{4F_{sc}}$ pulse train is applied to the clock input of a "D-type" flip-flop circuit 42, the $\overline{Q}$ terminal of which is connected as a second input to AND circuit 40. The sync stripper 34, of conventional design, produces horizontal drive pulses (waveform C of FIG. 12) in synchronism with the horizontal sync pulse of successive television lines, which are applied to the clock input to each of two flip-flop circuits 44 and 46, both of which are of "D-type." The $\overline{Q}$ output of flip-flop 44 is connected to the data (D) input so as to produce a pulse signal at half the horizontal drive frequency, illustrated in waveform (D) of FIG. 12, which is supplied to the clock terminal of a fourth flip-flop circuit 48. The $\overline{Q}$ output of flip-flop 48 is connected to its data input, and the Q output (waveform 3) is applied as one input to an AND circuit 50, the other input to which is the $\overline{Q}$ output of flip-flop 42 (waveform G). The Q output of flip-flop 42 (waveform F) resets flip-flop 48. The output of AND circuit 40, the result of ANDing waveforms (A) and (G), shown as waveform (H) of FIG. 11, is applied to the clock terminal of a fifth D-type flip-flop 52, the $\overline{Q}$ output terminal of which is connected to its data terminal. With the described connections, flip-flop 52 produces at its Q output the clock signal shown as waveform (I) of FIG. 12 having a frequency of $2F_{sc}$, which is applied to ADC 32. The ADC, which in the present embodiment is a PCM encoder, samples the analog video signal under control of this clock signal which shifts sampling phase every 2H, or every alternate television line; this gives the sampling pattern shown by the circles in FIG. 9.

The balance of the circuit illustrated in FIG. 10 is provided to minimize flicker at vertical color transitions by forcing the first sampling points of corresponding lines on odd fields to be superimposed, and the sampling points of all corresponding lines on even fields to be superimposed. This relationship is guaranteed in the system of FIG. 10 by resetting of the clock phase at the start of each frame. This is accomplished by applying successive frame pulses, from the sync stripper 34, to the clock terminal of a flip-flop 54, the data input terminal of which is set "high," and the "reset" input of which is connected to the Q output of previously mentioned flip-flop 46. The Q output of flip-flop 54 is applied as one input to an AND circuit 56, the other input to which is the output of an AND circuit 58 having the H-drive signal (waveform C) and the Q output of flip-flop 44 as inputs. The output of AND circuit 56 is applied to the "set" terminal of flip-flop 46, the data input of which is set "low," and to the clock terminal of which is applied the H-drive signal. With the described connections, the Q output of flip-flop 46 applied to the "set" terminal of flip-flop 44 ensures that the same spatial samples are selected on adjacent frames.

It is important to the proper operation of the encoding system of FIG. 10 that the analog NTSC color television signal be free of energy components at frequencies $(n+\frac{1}{4})F_h$ within the spectrum extending from $(2F_{sc}-F_v)$ to $F_v$, because otherwise the alias components generated by sub-Nyquist encoding would overlap the baseband video signal main spectral energy components and would be inseparable. This problem can be avoided by comb filtering the television signal prior to sub-Nyquist encoding to remove all $(n+\frac{1}{4})F_h$ energy components, with care exercised, however, to use the proper type of comb filter in order to avoid excessive loss of vertical resolution. If pre-encoding comb filtering is employed, one should use only the two-line comb filters shown in FIGS. 4 and 5, using either prior to sub-Nyquist encoding and the other for post-encoding filtering.

Figure 12:
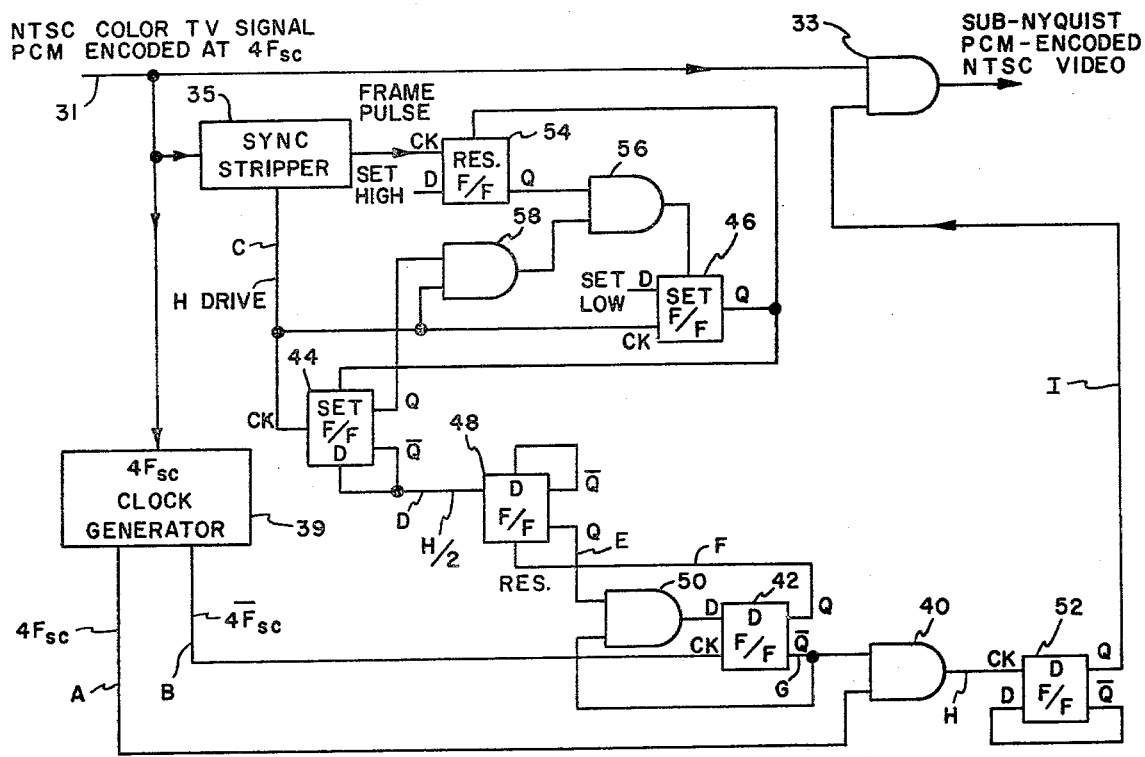
FIG. 12 is a block diagram of a system for deriving a sub-Nyquist sampled signal from a $4F_{sc}$ sampled signal.

FIG. 12 shows in block diagram form a system for obtaining a signal at the sub-Nyquist rate of $2F_{sc}$ from an NTSC color television signal PCM encoded at $4F_{sc}$ rate. A digital NTSC color video signal, PCM encoded at $4F_{sc}$, which has preferably been subjected to comb filtering for the reasons and in the manner previously discussed, is received on line 31 and coupled to the input of AND gate 33, sync stripper 35, and $4F_{sc}$ clock regenerator 39. It should be noted that the PCM signal at line 31 could consist of either a serial bit stream at $4F_{sc} \times N$ bit rate, where N is the number of bits used to quantize each video sample, or a $4F_{sc}$, N parallel bits, PCM encoded signal. In the latter case, line 31 would actually consist of N lines and gate 33 would represent N AND gates. Clock regenerator 39 produces two trains of clock pulses both having frequency of $4F_{sc}$ but with one 180° out of phase with respect to the other, as shown by waveforms (A) and (B) of FIG. 11.

The digital sync stripper 35 performs analogous functions to those of sync stripper 34 of FIG. 10. The AND gate 33, controlled by gating signal (I) of FIG. 11, allows every other $4F_{sc}$ sample to pass through; in addition, it provides the extra sample displacement every 2H, or every alternate TV line, to give the sampling pattern shown by the circles of FIG. 9.

All of the other circuits of the system of FIG. 12 are the same circuits as in FIG. 10, and the waveforms of FIG. 11 and their description given in the operation of the circuits of FIG. 10 also apply to FIG. 12.

Figure 13:
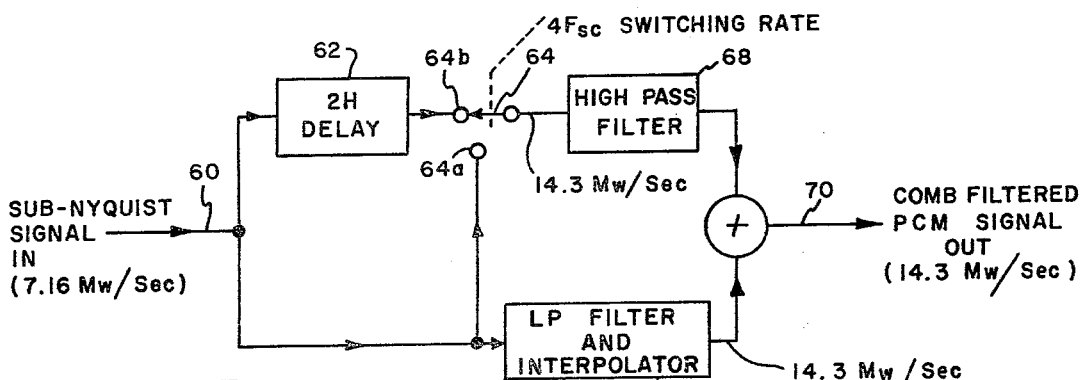
FIG. 13 is a block diagram of the equivalent digital implementation of the filter shown in FIG. 4.

Whether the sub-Nyquist sampled signal is derived from $4F_{sc}$ samples using the system of FIG. 12, or obtained by sampling of an analog NTSC video signal using the system of FIG. 10, $4F_{sc}$ samples may be regenerated in a number of ways, one example of which is shown in FIG. 13. This is a digital implementation of the filter circuit of FIG. 4 for sub-Nyquist to super- Nyquist digital-to-digital conversion. The sub-Nyquist signal, at a frequency of 7.16 Mw/sec. is received on line 60 and applied to a digital delay device 62 having a delay of two television lines, to one terminal 64a of a switching device schematically shown at 64, and also to the input terminal of a low-pass filter and interpolator 66. The switching device 64 has a switching rate of $4F_{sc}$ thereby to alternately switch between undelayed video samples (which may be designated line 1) and video samples delayed by two television lines (that is, from line 1-2). This operation of adding the digital bit streams from two television lines (the comb filter) really consists of inserting the current samples of line 1 between the video samples from line (1—2) whereby the $4F_{sc}$ sampling rate is reobtained. The resulting signal, however, will exhibit a comb filter characteristic throughout the whole video baseband; this problem is overcome by applying the $4F_{sc}$ signal to a high pass filter 68 having characteristics to limit the comb filter response to the frequency band above $(2F_{sc}-F_v)$. The non-comb-filtered lower video baseband is obtained by low-pass filtering the signal of line 1 from dc to $(2F_{sc}-F_v)$ in low pass filter 66 and doubling its sampling rate by means of a linear phase interpolator of known construction. The output of filter and interpolator 66 is added in a summing device, diagrammatically shown at 70, to the high passed signal from filter 68 to construct the super-Nyquist sampled video signal which, in this case, has a sampling frequency of $4F_{sc}$ or a sampling rate of 14.3 Mn/sec.

Figure 14:
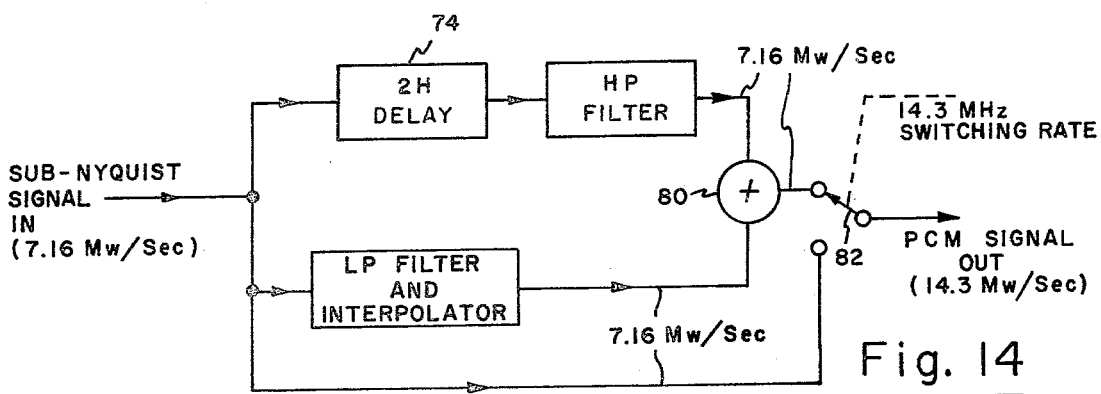
FIG. 14 is a block diagram of a digital-to-digital converter for converting from sub-Nyquist to $4F_{sc}$.

It has been shown in BBC Research Department Report 1977/21 entitled "Digital Video: Multiple sub-Nyquist coding" by J. M. Stott and T. J. Phillips, that repeated sub-Nyquist encoding of PAL television signals does no significantly impair the television picture beyond that introduced by the first sampling operation. Since the herein described sub-Nyquist technique for an NTSC color television signal can satisfy all the requirements set forth in the BBC report for a PAL signal undergoing multiple sub-Nyquist encoding, the analysis given therein for the PAL signal can be readily extended to the NTSC signal to prove that no extra degradation due to resampling occurs. Indeed, it can be readily shown that the re-sampling process can be performed indefinitely without any degradation beyond that introduced by the first conversion. This will be more readily understood from consideration of the block diagram of FIG. 14, which is of the block diagram of FIG. 13 re-drawn to its exact equivalent. In the arrangement shown in FIG. 14, the television line (1—2) delayed by 2H by delay device 74, is high pass filtered above $(2F_{sc}-F_v)$ and is added in summing device 80 to the non-delayed television line 1 which is low-pass filtered to $(2F_{sc}-F_v)$. The low pass filter includes an interpolator for generating video samples in television line 1 that are time coincident with the samples from television line (1—2). The nondelayed digital bit stream of line 1 is also fed directly to an output switch 82 having a switching rate of $4F_{sc}$ or 14.3 MHz. The super-Nyquist signal is regenerated at switch 82 by taking the essentially unprocessed samples from line 1 (which are also original samples of the $4F_{sc}$ sampled video) and inserting between those samples the low-passed/high-passed combination of 1 and (1—2) samples. The resultant super-Nyquist signal is truly a $4F_{sc}$ PCM NTSC color television signal which has undergone a comb filter process equal to that shown in FIG. 4. It will now be clear that one can repeat the sub-Nyquist coding process indefinitely as long as the same samples from the same frames are always selected, since this guarantees that the sub-Nyquist digital stream will always consist of a selected set of unprocessed $4F_{sc}$ samples Tests of this sub-Nyquist sampling system with a variety of NTSC color television signals gave good results. Using the system of FIG. 10 or FIG. 12 to obtain a sub-Nyquist sampled signal, the $4F_{sc}$ samples were regenerated using the system of FIG. 14. The results were better than those obtained using the $2F_{sc}-\frac{1}{4}F_h$ or $2F_{sc}+\frac{1}{4}F_h$ sampling rates taught by applicant's U.S. Pat. No. 4,065,784. The improvement results from the elimination of the 7.5 Hz flicker at vertical color transitions by the use of the frame resetting pulse that forces the sampling points on adjacent frames to be superimposed. If the frame pulse from the sync stripper is not used, results equivalent to those obtained with the previous system are obtained.

It should be noted that the effect of sub-Nyquist sampling on the luminance details is dependent on the angle between the picture detail and the scanning lines. Vertical luminance transitions are normally not impaired since their frequency components do not extend into the passband of the comb filter. With diagonal transitions, however, the comb filter reduces the amplitude of wanted frequency components above $f_s-f_v$, and the corresponding alias components are not completely removed. In general, however, a small deterioration of diagonal transitions does not appear subjectively objectionable. Horizontal transitions are virtually unaffected because their energy components do not normally fall within the nulls of the comb filter.

The effect of the sub-Nyquist system on chrominance was judged imperceptible with most broadcast signals. Only highly saturated colors generate one or two lines of wrong chrominance at sharp vertical color transitions. This problem is particularly noticeable with 100% saturated split field color bars. Other stationary pictures including scenes from slides No. 1 to 15 of the SMPTE Television Color Reference slide set were judged not objectionably impaired.

I claim:

1. A method of digitally encoding an NTSC color television signal having a color subcarrier frequency $F_{sc}$ and a line scan frequency $F_h$, comprising the steps of:
   generating a sampling signal having a frequency $2F_{sc}$, the sampling phase of which shifts by 180° every alternate time sequential television line;
   sampling said television signal in response to the sampling signal; and
   converting the sampled television signal into digital form.

2. The method according to claim 1, including the further step of
   comb filtering the television signal before sampling to remove therefrom any $(n+\frac{1}{4})F_h$ energy components, where n is an integer.

3. Apparatus for digitally encoding an NTSC color television signal having a color subcarrier frequency $F_{sc}$ and a line scan frequency $F_h$, comprising, in combination:
   means for generating a sampling sigal having a frequency $2F_{sc}$ and the sampling phase of which shifts by 180° every alternate time sequential television line;
   means for sampling the television signal in response to said sampling signal; and means for converting the sampled television signal into digital form.

4. A method of deriving a sub-Nyquist sampled pulse code modulated NTSC color television signal from a pulse code modulated color television signal sampled at $4F_{sc}$, where $F_{sc}$ is the color subcarrier frequency, comprising the steps of:
- selecting every other $4F_{sc}$ sample in each line of the $4F_{sc}$ sampled television signal; and
- introducing a one $4F_{sc}$ sample displacement every two sequential television lines.

5. Apparatus for deriving a sub-Nyquist sampled pulse code modulated NTSC color television signal from a pulse code modulated color television signal sampled at a frequency of $4F_{sc}$, where $F_{sc}$ is the color subcarrier frequency of the color television signal, said apparatus comprising:
- means for selecting every other $4F_{sc}$ sample in each line of the $4F_{sc}$ sampled television signal; and
- means for introducing a one $4F_{sc}$ sample displacement every two sequential television lines.

6. Apparatus for deriving from a pulse code modulated NTSC color television signal having a color subcarrier frequency $F_{sc}$, a line scan frequency $F_h$, a maximum baseband frequency $F_v$, and sampled at a sub-Nyquist sampling frequency of $2F_{sc}$, a pulse code modulated color television signal having a sampling frequency of $4F_{sc}$, said apparatus comprising:
- means for delaying said $2F_{sc}$ sampled signal by two television lines,
- means for high-pass filtering said delayed $2F_{sc}$ sampled signal to pass frequencies in the band above $(2F_{sc}-F_v)$,
- means for low-pass filtering said $2F_{sc}$ sampled signal to pass frequencies in the band from D.C. to $(2F_{sc}-F_v)$,
- means for interpolating said low-pass filtered $2F_{sc}$ sampled signal to generate video samples that are time-coincident with video samples of said $2F_{sc}$ sampled signal delayed by two television lines,
- means for adding said high-pass filtered delayed sampled signal to said interpolated low-pass fitered sampled signal, and
- means for alternately switching the output signal from said adding means and said $2F_{sc}$ sampled signal to an apparatus output terminal at a switching rate of $4F_{sc}$.

7. A system for encoding a composite NTSC color television signal including luminance and chrominance components wherein the chrominance component is formed by modulating a subcarrier wave having a frequency $F_{sc}$ with chrominance information, the frequency $F_{sc}$ having m/2 of the line scan frequency $F_h$ of said television signal, where m is an odd number, the phase of said subcarrier wave shifting by 180° between two adjacent lines, said encoding system comprising:
- means for producing sampling pulses having a repetition frequency $2F_{sc}$;
- means for sampling and encoding said television signal in response to said sampling pulses; and
- means for controlling said sampling pulses to cause samples of said television signal to be taken at points about 180° of said subcarrier wave away from each other in each scanning line and also about 90° of said subcarrier wave away from the samples taken in alternate time sequential scanning lines.

8. Apparatus in accordance with claim 7, wherein said color television signal is applied to both said means for sampling and encoding and said means for producing sampling pulses, and wherein said means for producing sampling pulses comprises:
- a sync stripper connected to receive said color television signal and producing a horizontal synchronizing signal $F_h$,
- means connected to receive said color television signal and producing two signals $4F_{sc}$ displaced in phase from each other by 180°;
- means connected to receive said horizontal synchronizing signal $F_h$ from said sync stripper for producing a signal $F_h/2$, and
- means for combining said signals $4F_{sc}$ and said signal $F_h/2$ to produce sampling pulses $F_s$ having a repetition frequency $2F_{sc}$, the phase of which shifts by about 180° every two scanning lines.

9. Apparatus in accordance with claim 7 or claim 8, wherein said color television signal is applied to said sampling and encoding means through comb filtering means for removing therefrom any $(n+\frac{1}{4})F_h$ energy components, where n is an integer.

10. Apparatus for deriving a sub-Nyquist sampled pulse code modulated NTSC color television signal from a pulse code modulated NTSC color television signal sampled at a rate of $4F_{sc}$, where $F_{sc}$ is the frequency of the subcarrier wave of the television signal which is modulated with chrominance information, and where the samples are taken at points about 90° of said subcarrier wave away from each other in each scanning line, the frequency of which is $F_h$, said apparatus comprising:
- an AND gate having first and second inputs connected to receive at its first input the $4F_{sc}$ sampled television signal, and
- means connected to receive the $4F_{sc}$ sampled television signal and producing and applying to the second input of said AND gate control pulses to cause said AND gate to select every other sample in each line of the $4F_{sc}$ sampled television signal, whereby the selected samples are at points about 180° of said subcarrier wave away from each other, and also to displace the selected samples by about 90° of said subcarrier wave every two sequential television lines.

11. Apparatus in accordance with claim 10, wherein the $4F_{sc}$ sampled television signal is applied to both said AND gate and said means for producing control pulses, and wherein said means for producing control pulses comprises:
- means including a sync stripper connected to receive said $4F_{sc}$ sampled television signal for producing a signal $F_h/2$, where $F_h$ is the line scan frequency of said color television signal,
- means connected to receive said $4F_{sc}$ sampled television signal and producing in response thereto two clock signals having a frequency of $4F_{sc}$ displaced in phase from each other by 180°, and
- means for combining said clock signals and said signal $F_h/2$ to produce said control pulses.

* * * * *